US008308326B2

(12) United States Patent
Dubosc et al.

(10) Patent No.: US 8,308,326 B2
(45) Date of Patent: Nov. 13, 2012

(54) LIGHTING OR SIGNALING DEVICE COMPRISING A CURVED LIGHT GUIDING PLATE

(75) Inventors: Christophe Dubosc, Villemomble (FR); Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 13/310,845

(22) Filed: Dec. 5, 2011

(65) Prior Publication Data

US 2012/0075876 A1 Mar. 29, 2012

Related U.S. Application Data

(63) Continuation of application No. 12/794,998, filed on Jun. 7, 2010, now Pat. No. 8,070,336, which is a continuation of application No. 11/780,672, filed on Jul. 20, 2007, now Pat. No. 7,731,400.

(30) Foreign Application Priority Data

Jul. 21, 2006 (FR) ...................................... 06 06718

(51) Int. Cl.
*B60Q 1/56* (2006.01)

(52) U.S. Cl. ......................... 362/498; 362/517; 362/518

(58) Field of Classification Search .................. 362/498, 362/517, 518

See application file for complete search history.

(56) References Cited

U.S. PATENT DOCUMENTS

| | | | | |
|---|---|---|---|---|
| 6,193,383 | B1 | 2/2001 | Onikiri et al. | |
| 6,247,826 | B1 | 6/2001 | Funamoto et al. | |
| 6,447,155 | B2 | 9/2002 | Kondo | |
| 6,536,921 | B1 | 3/2003 | Simon | |
| 6,598,998 | B2 * | 7/2003 | West et al. | 362/307 |
| 6,836,611 | B2 | 12/2004 | Popovic | |
| 6,871,988 | B2 | 3/2005 | Gebauer et al. | |
| 6,880,945 | B2 | 4/2005 | Knaack | |
| 7,021,805 | B2 * | 4/2006 | Amano et al. | 362/518 |
| 7,025,482 | B2 | 4/2006 | Yamashita | |
| 7,334,932 | B2 | 2/2008 | Klettke | |
| 7,503,666 | B2 | 3/2009 | Tamura | |
| 7,513,670 | B2 | 4/2009 | Yang et al. | |
| 7,585,083 | B2 | 9/2009 | Kim et al. | |
| 7,909,496 | B2 * | 3/2011 | Matheson et al. | 362/609 |
| 7,942,560 | B2 * | 5/2011 | Holder et al. | 362/545 |
| 2001/0015899 | A1 | 8/2001 | Kondo | |
| 2006/0291244 | A1 | 12/2006 | Yang et al. | |

FOREIGN PATENT DOCUMENTS

| | | |
|---|---|---|
| DE | 19925363 | 12/2000 |
| EP | 1126209 | 8/2001 |
| FR | 2813654 | 3/2002 |

* cited by examiner

*Primary Examiner* — Evan Dzierzynski
(74) *Attorney, Agent, or Firm* — Jacox, Meckstroth & Jenkins

(57) ABSTRACT

A lighting or signaling device for a motor vehicle which is capable of emitting a linear beam in the direction of an optical axis and which comprises a point light source that emits light rays radially around a source; a light ray guiding plate; wherein the light guiding plate is shaped so that the light rays generally propagate in incident propagation planes normal to the plate between the light source and the reflection edge and in reflected propagation planes normal to the plate between the reflection edge and the output edge.

29 Claims, 6 Drawing Sheets

LIGHTING OR SIGNALING DEVICE COMPRISING A CURVED LIGHT GUIDING PLATE

CROSS-REFERENCE TO RELATED APPLICATIONS

This application is a continuation of U.S. Ser. No. 12/794,998 filed Jun. 7, 2010, which is a continuation of U.S. Ser. No. 11/780,672 filed Jul. 20, 2007, now issued as U.S. Pat. No. 7,731,400, which are incorporated herein by reference and made a part hereof. This application also claims priority to French Application No. 0606718 filed Jul. 21, 2006, which application is incorporated herein by reference and made a part hereof.

BACKGROUND OF THE INVENTION

1. Field of the Invention

The invention concerns a lighting or signaling device for a motor vehicle which comprises a plate for guiding the light.

The invention more particularly concerns a lighting or signaling device for a motor vehicle which is capable of emitting a linear beam essentially in the direction of an optical axis, and which comprises:

a point light source that emits light rays radially around a source axis; and a light ray guiding plate that comprises an edge for inputting the light rays, a front edge for outputting the light rays tangentially to the light guiding plate, and a rear edge for reflecting the light rays coming from the light source in the direction of the output edge.

2. Description of the Related Art

It is common practice to group several lighting and/or signaling functions together in a single enclosure, so as to simplify the electrical wiring for these different functions in a motor vehicle.

Moreover, the shape of the lighting and/or signaling lights plays a leading role in the search for a style and original aesthetics which will enable the motor vehicle to be recognized from a distance.

To solve these problems, equipping the vehicle with light guides is known. A light guide is a cylinder of transparent material which forms a kind of "pipe" into which the light rays enter via a first input end. The light rays are then guided along the light guide by successive total reflections on its cylindrical outer face.

A rear portion of the cylindrical face of the light guide comprises irregularities, such as diffusion flutes, which make it possible to diffuse some of the light rays towards the front so that some of the diffused light rays exit the light guide by passing through the opposite portion of the cylindrical face in order to form a light beam.

The light guide can for example be shaped as a ring that surrounds the front boundary of a low beam headlamp so as to emit an annular light beam. The input end portion of the light guide is then bent so that the light ray input end is arranged outside the ring formed by the light guide.

However, such a solution does not make it possible to obtain a high intensity light beam. This is because the light rays emitted by the light source are guided in a random and unordered manner inside the light guide. Moreover, only some of the light rays are diffused to the outside by the irregularities. Consequently, the light beam obtained by such a device is very weak even if the light source arranged at the input end of the light guide is very powerful.

However, certain lighting and signaling functions require a very intense light beam in order to comply with current regulations. The light guide is therefore not suitable for implementing such functions.

Moreover, the appearance of the annular beam obtained is highly non-uniform in particular for the following two reasons.

On the one hand the material constituting the lighting or signaling device brings about some absorption of the light rays that pass through it, which results in losses that become greater with the distance away from the light source. As a result the brightness in the vicinity of the light source is greater than at a distance from this source, hence a uniformity fault.

On the other hand some of the light rays introduced into the light guide via the bent input portion directly reach the opposite face of the light guide thus causing the appearance of a spot that is very bright compared with the rest of the annular beam.

There is, therefore, a need to provide an improved lighting or signaling device.

SUMMARY OF THE INVENTION

To solve these problems, the invention proposes a lighting or signaling device for a motor vehicle comprising a light source and a light ray guiding plate which comprises an edge for inputting the light rays, a front edge for outputting the light rays tangentially to the light guiding plate, and a rear edge for reflecting the light rays coming from the light source in the direction of the output edge, in which:

the light guiding plate comprises an area for coupling with the light source shaped so that the light rays emitted by the light source are propagated radially at the coupling area around a source axis;

the light guiding plate is shaped so that the light rays propagate in meridian incident propagation planes normal to the plate between the light source and the reflection edge, and in reflected propagation planes normal to the plate between the reflection edge and the output edge; and the reflection edge is shaped so that the reflected propagation planes have an orientation with respect to the optical axis such that the lighting device is capable of emitting a linear light beam along an essentially longitudinal optical axis.

According to other characteristics of the invention:

the reflected propagation planes are parallel to the optical axis of the lighting device;

the reflected propagation planes are orthogonal to the output edge;

the light guiding plate (12) has a curved shape;

at least a first rear portion of the light guiding plate which is delimited by an angular sector extending from the source axis and which surrounds the reflection edge, has the shape of a portion of base sphere;

the source axis passes through the center of the base sphere;

a second front portion of the light guiding plate forms a solid of revolution around the optical axis that passes through the center of the base sphere;

the reflected propagation planes are secants along the optical axis;

at least two light guiding plates are arranged in a first stratum, at least a third light guiding plate being arranged in a second stratum, each light guiding plate being a portion of a base sphere;

the light guiding plates of the first stratum are portions of a first common base sphere, and in that the light guiding plates of the second stratum are portions of a second common base sphere, all the light guiding plates being centered on a common center;

the light guiding plates have different axes and different radii of curvature;

the light ray output edge comprises means for defining the spread of the light beam around the direction of the optical axis in the reflected propagation plane;

the output edge is shaped like a lens in order to deviate the light rays by refraction;

the light guiding plate is flat;

the output edge forms an angle with the normal to the optical axis at several of its points and is capable of refracting the outgoing light rays, the reflection edge being shaped so that the reflected propagation planes have an orientation with respect to the output edge such that the light rays are essentially parallel or parallel to the optical axis once refracted by the output edge; in the absence of flutes on the output edge, the light rays refracted by the output edge will be parallel to the optical axis; in the presence of flutes spreading the light horizontally, the light rays refracted by the output edge will be essentially parallel to the optical axis, and the beam exiting each flute will be centered on an axis parallel to the optical axis;

the output edge is essentially flat, the reflection edge having at least one parabolic shape whereof the directrix forms an angle with the normal to the output edge such that the light rays are essentially parallel or parallel to the optical axis once refracted by the output edge; in the absence of flutes on the output edge, the light rays refracted by the output edge will be parallel to the optical axis; in the presence of flutes spreading the light horizontally, the light rays refracted by the output edge will be essentially parallel to the optical axis, and the beam exiting each flute will be centered on an axis parallel to the optical axis;

the output edge is curved, the reflection edge having a complex shape such that, for any point on the output edge, any ray reflected by the reflection edge arriving at this point on the output edge is refracted parallel to the optical axis;

the output edge comprises means for defining the spread of the light beam in a plane tangential to the light guiding plate;

the output edge comprises flutes that are capable of deviating the outgoing light rays by refraction in a plane tangential to the light guiding plate;

the light guiding plate comprises holes that are arranged in proximity to the output edge, the light rays being deviated from their path in a tangential plane by passing through the wall of the hole before entering the light guiding plate again in the direction of the output edge;

the holes are aligned in staggered rows parallel to the output edge;

the light ray input edge comprises a front portion that is shaped so as to disperse the light rays coming from the light source heading directly towards the output edge;

the light source is a radially emitting LED and the light guiding plate comprises an aperture having a peripheral edge that corresponds to the input edge, the radially emitting LED being placed inside the aperture;

the light source is an axially emitting LED and the light guiding plate comprises a reflection surface corresponding to a shape complementary to a cone whereof the axis of symmetry corresponds to the source axis of the light source, this reflection surface being arranged opposite the input edge in order to direct the light rays radially in the light guiding plate;

preferentially the complementary shape comprises a part with a conical profile and a flat part, the part with the conical profile being surrounded by the reflection edge and the flat part being oriented facing the output edge so that the rays emitted at the flat part are reflected parallel to a preferred direction, for example the optical axis; thus, all the rays arriving on the shape with the conical profile are reflected towards the reflection edge, whereas those which would not be able to reach this reflection edge if the complementary shape had a completely conical profile, reach the flat surface and are therefore reflected parallel; the optical efficiency of the device is thus increased;

the light source is arranged at a distance from the input edge, the emitted light rays being guided as far as the reflection face in the shape of an angular sector of a cone with source axis in order to direct the light rays radially solely towards the reflection edge of the light guiding plate.

Other characteristics and advantages will emerge from a reading of the following detailed description, for the understanding of which reference should be made to the accompanying drawings, amongst which:

BRIEF DESCRIPTION OF THE ACCOMPANYING DRAWINGS

DETAILED DESCRIPTION OF THE PREFERRED EMBODIMENTS

Subsequently, identical, analogous or similar elements will be designated by the same reference numbers.

Figure 1:
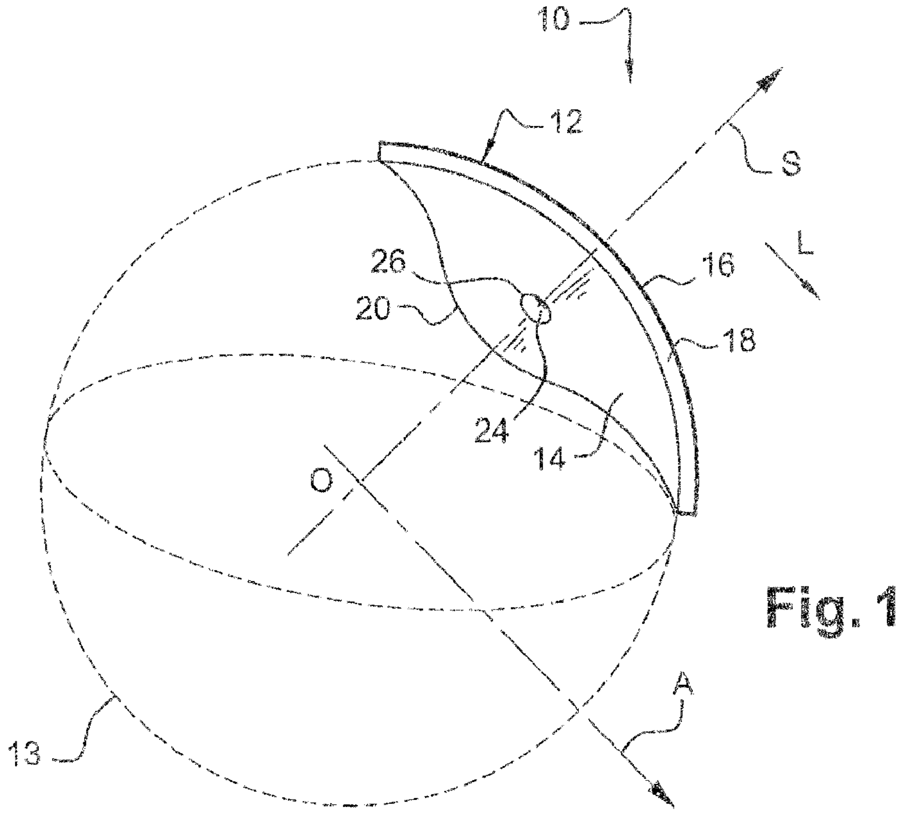
FIG. 1 is a front view depicting a lighting device according to the invention comprising a light guiding plate.
Figure 2:
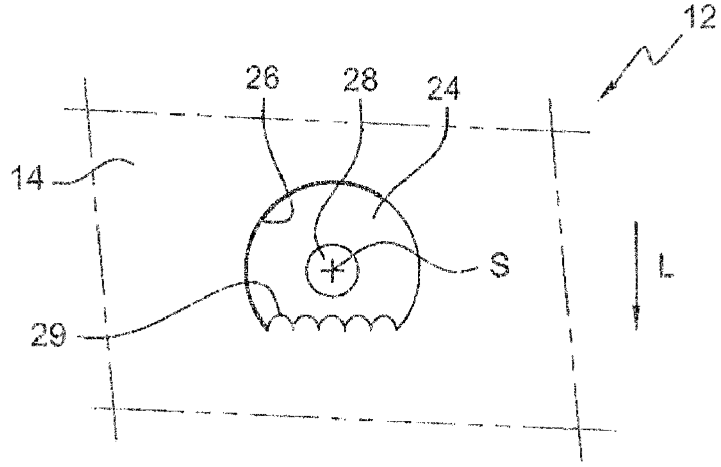
FIG. 2 is a detail view on a larger scale of the arrangement of a light source in the light guiding plate of FIG. 1.

For the remainder of the description, there will be adopted on a non-limiting basis a longitudinal orientation fixed with respect to the motor vehicle and directed from the rear to the front which is indicated by the arrow "L" in FIGS. 1 and 2.

FIG. 1 depicts a lighting or signaling device 10 for a motor vehicle. The lighting device 10 is capable of emitting a linear light beam "F" along essentially longitudinal optical axis A (FIG. 1).

The lighting device 10 comprises in particular at least one light guiding plate 12 which appears in the form of a portion of a segment of a sphere. The lighting device 10 depicted in FIG. 1 comprises a single light guiding plate 12 forming a portion of an imaginary base sphere 13.

For the remainder of the description, there will be adopted locally at any point of the light guiding plate 12, and on a non-limiting basis, a normal orientation N orthogonal to the light guiding plate.

The light guiding plate 12 is thus delimited in the thickness direction by a front face 14 and a rear face 16 for guiding the light. The two faces, front 14 and rear 16, are parallel to each other over at least part of the plate.

The light guiding plate 12 is in particular delimited laterally by a front edge 18 for outputting the light rays and by a rear edge 20 for reflecting the light. In the example depicted in FIG. 1, the ends of the reflection edge 20 are connected directly to the ends of the output edge 18 so as to form the external boundary of the light guiding plate 12.

The reflection edge 20 can consist of a reflective plate, such as an aluminized coating on the outer face of the reflection edge 20. It can also be provided that, between the two junctions between the reflection edge 20 and each of the faces 14 and 16 of the light guiding plate 12, the output edge 18 has a ridge extending along this edge and dividing it into two faces forming an angle between them. Thus an incident ray RI (FIG. 3) will undergo a double reflection, a first on one of the faces and a second on the other face, in order to be emitted in the reflected propagation plane "Mr". For ease of understanding, in FIG. 10, the plane "Mr" in which the represented ray "RR" propagates is normal to the page (of drawing) and is along the represented ray "RR". For example, the plane "Mr" of FIG. 5 corresponds to plane 5-5 in FIG. 3.

The boundary of the light output edge 18 here forms a flat arc of a circle, that is to say the boundary of the output edge is defined by the intersection between the base sphere 13 and a plane.

Figure 7:
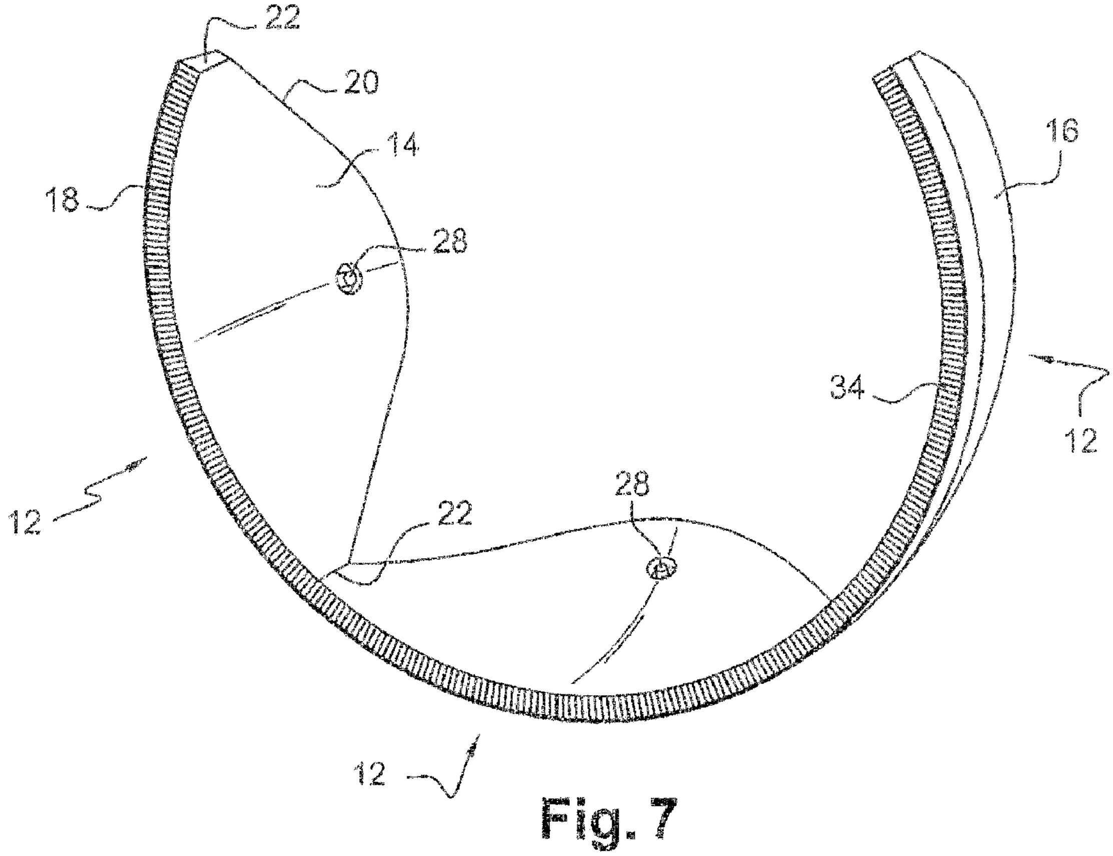
FIG. 7 is a perspective view depicting a lighting device that comprises a plurality of light guiding plates that are arranged on a base sphere and in which the output edges of the light guiding plates comprise flutes.

According to a variant of the invention depicted in FIG. 7, the external boundary of the light guiding plate 12 also comprises inactive transition areas 22 that are interposed between the reflection edge 20 and the output edge 18.

As depicted in FIG. 2, the light guiding plate 12 also comprises an aperture 24 that is delimited by a peripheral light input edge 26. The aperture 24 is here a through aperture. A light source 28 is arranged in the aperture 24 close to or in contact with the light ray input edge 26.

The light source 28 is capable of emitting light rays in an essentially radial direction around a source axis "S" that is normal to the light guiding plate 12. More precisely, the light source 28 is capable of emitting a fan of light rays radially at least towards the rear in the direction of the reflection edge 20.

The light source 28 is here a so-called "Side Emitter" light emitting diode or "LED" which emits light rays in a fan for example of approximately 30° either side of the radial direction in a plane meridian to the source axis "S" and which is capable of extending around the source axis "S", for example over 360° in a plane normal to the source axis "S".

Figure 11:
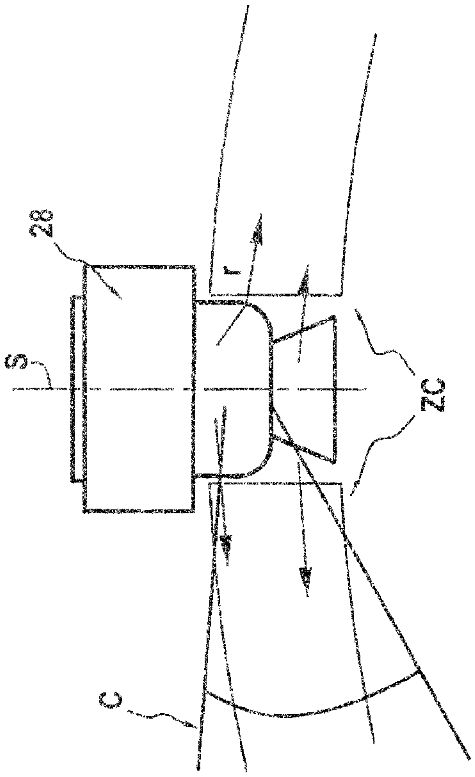
FIG. 11 is a detail sectional view on a larger scale of the arrangement of a light source in the light guiding plate of FIG. 1.

As depicted in FIG. 11, the "side emitter" type LED is disposed so that its emitting surface is in a through opening made in an area "ZC" for coupling with the light source 28. Rays r emitted radially by the LED are depicted and all start off in the thickness of the coupling area "ZC". The emission cone C of the LED is also depicted schematically, and approximately corresponds at the input edge to the thickness of the light guiding plate. Thus the coupling area "ZC" allows coupling between the light guiding plate 12 and the light source 28, so that the light rays emitted by the light source are propagated radially at the coupling area around a source axis "S".

Figure 12:
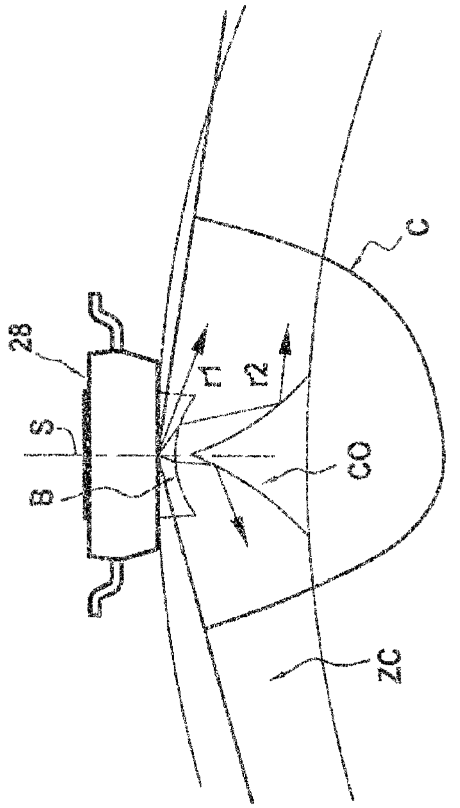
FIG. 12 is a detail sectional view of the arrangement of a light source with the light guiding plate according to a variant embodiment.
Figure 13:
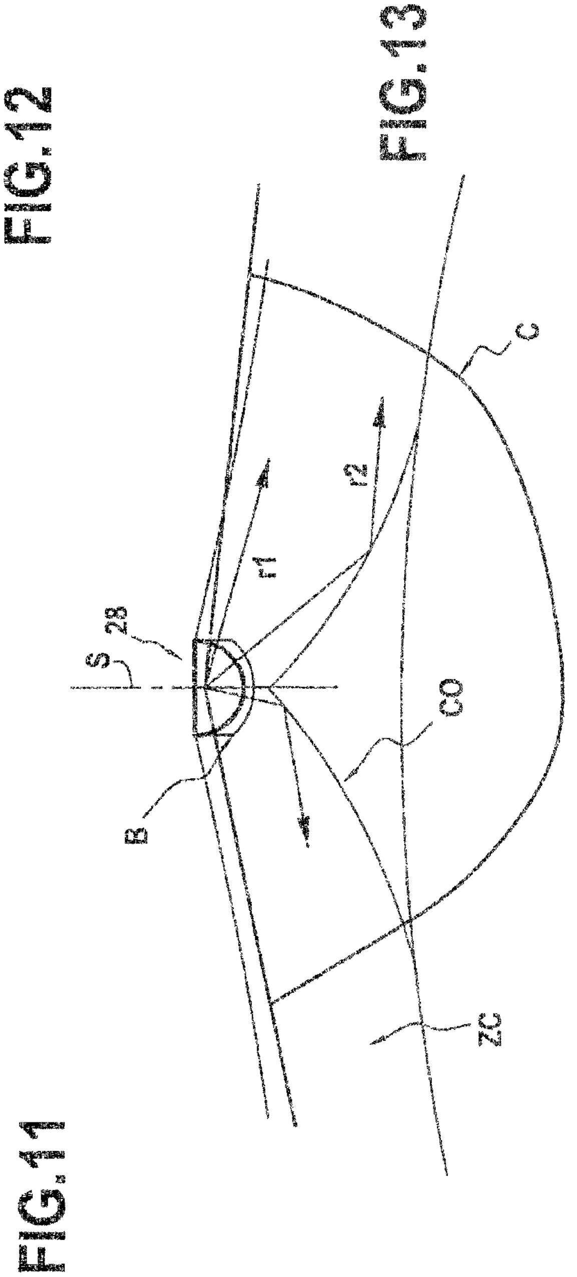
FIG. 13 is a detail sectional view of the arrangement of a light source with the light guiding plate according to another variant embodiment.

According to variants depicted in FIGS. 12 and 13, the aperture opens out solely in one of the guidance faces of the light guiding plate 12 but not in the other face. Thus in FIG. 12, the source 28 is here a Lambertian type LED, or axially emitting LED. Here, it is a LED lacking a dome, for example a LED available under the trade name "Golden Dragon". It emits in a half-space. It is disposed so that its emitting surface is flush with the surface of the coupling area "ZC" which has been arranged so that the light rays emitted by the light source are then redirected radially at the coupling area around a source axis "S". The coupling area "ZC" locally has an input area in the form of a convex rounded surface "B" (FIG. 12) on the face on the side of which the LED 28 is situated, and, on the opposite face and facing this convex face "B", an area approximating the shape of a shape complementary to a cone "CO". Two types of light ray emitted by this LED can be distinguished: r1 type rays that directly enter the thickness of the coupling area, and r2 type rays that are first refracted by the surface B and then totally reflected by the walls of the cone "CO." The emission cone "C" of the LED is also depicted.

According to the variant depicted in FIG. 13, a Lambertian type LED with a protective dome is used this time. Such a LED is for example known by the trade name "Led Rebel". The LED 28 is disposed in the coupling area "ZC" so that the dome is inserted in a non-through opening made in the coupling area. There is in this opening a convex rounded surface "B'" and on the opposite face of the coupling area a prepared surface of an area approximating the shape of a shape complementary to a cone "CO" so that, as in FIG. 12, the rays that reach it set off again in the coupling area "ZC" by total reflection. There are therefore found, as in FIG. 12, two types of ray emitted by the LED: those of r1 type emitted towards the sides that directly enter the coupling area, and those of r2 type that are first refracted on the surface B and then totally reflected on the modified surface situated facing the surface B.

The cone "CO" can also have a deformed area making it possible to send back the rays that, without this area, would directly reach the output edge. This concerns for example a kind of "truncation" so that the reflection area "CO" has a flat face. Thus, according to a section along a plane perpendicular to the source axis "S" and approximately at the face of the light guiding plate which is opposite the LED 28, the perimeter of the cone corresponds to a circle. With the truncation, a section is obtained in the form of a circle in which an arc of a circle has been removed, a straight line connecting the two ends of the remaining part of the circle. A flattened circle is therefore obtained. This straight line constitutes the base of the triangle formed by the truncation on the cone. The tip of this triangle opposite to this base is situated on the cone between the two faces of the light guiding plate, preferentially in proximity to the tip of the cone. A cone with a flatted face is therefore obtained. This flattened face is situated facing the output edge. All the rays emitted above the part with the conical profile will therefore be distributed around the source axis "S" inside an angular interval corresponding to the circular part of the section of the cone on the face opposite to the LED 28. Preferentially the tip of the flat face is situated between the tip of the cone and the base thereof, on the side of the output edge (for example on the left in FIGS. 12 and 13). Thus the angular interval is greater than 180°. The reflection edge surrounds this area with the conical profile and therefore all the rays reflected around the source axis "S" are reflected a second time by the reflection edge. On the other hand, the rays emitted above the flat face will be reflected in the same direction and directly towards the output edge, the base of the triangle constituting the flat face perpendicular to the optical axis.

In conclusion on the choice of LEDs, it can be seen that one embodiment of the invention makes it possible to use LEDs with very different characteristics, capable of emitting either radially, or axially, or in a half-plane. It is then necessary to arrange the coupling area accordingly, for example by making an opening that is either through or not for inserting therein all or part of the LED, and by providing optical means when necessary (in particular for LEDs emitting in a half-plane) so that the maximum amount of the light emitted by the LED propagates correctly in the thickness of the coupling area without loss as far as the rear reflection area 20.

In the examples depicted, the light input edge 26 is thus surrounded by the external boundary comprising the output edge 18 and by the reflection edge 20 of the light guiding plate 12. The input edge 26 could however not be closed. This is because there is a sector of this edge 26 that is not very effective, situated opposite the reflection edge 20, and for which the rays reflected by the edge 20 return towards the input edge 26. These light rays are therefore not used in the lighting or signaling device, and they are lost. Advantage can be taken of this observation to not dispose any material in this region, in order to thus facilitate the removal of the light guiding plate from the mould.

The light guiding plate 12 is made from a transparent material whereof the refractive index is higher than the refractive index of the medium in which the lighting device 10 is intended to be immersed, air for example. Thus, a light ray introduced into the thickness of the plate 12 via its input edge 26 with an incident angle with respect to the normal "N" which is greater than a critical angle of refraction is capable of being totally reflected by the guidance faces 14, 16.

The light ray is therefore guided in the thickness of the light guiding plate by successive reflections between the two guidance faces 14, 16.

Figure 3:
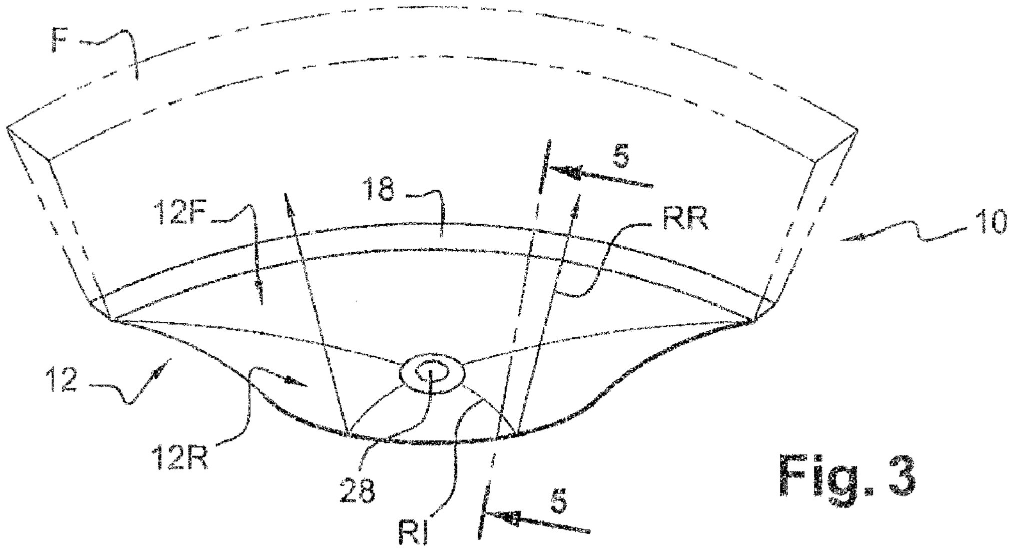
FIG. 3 is a bottom view of the light guiding plate of FIG. 1.

As depicted in FIG. 3, the incident light rays that start off towards the rear are intended to be reflected by the reflection edge 20, and then the light rays thus reflected are directed towards the output edge 18. The reflected light rays thus exit via the output edge 18 tangentially to the light guiding plate 12 in order to form the linear light beam "F" in an arc of a circle.

For the remainder of the description, an incident light ray will be defined as a light ray that is emitted by the light source 28 in the direction of the reflection edge 20. The light rays emitted by the light source 28 directly in the direction of the output edge 18 are therefore not included in this definition of incident rays. The light rays that are emitted towards the front by the light source 28 directly in the direction of the output edge 18 will be referred to as "direct".

The light source 28 can also consist of an incandescent bulb, for example a halogen bulb, with axial filament, inserted within the boundary delimited by the input edge 26. Provision can then advantageously be made in this case that an area of the light guiding plate, in the vicinity of the input edge 26, is made of glass, while the remainder of the plate will be made of plastic overmolded on this glass area. Such a design makes it possible to avoid thermal problems that could be generated by the use of an incandescent source.

To avoid the input edge 26 being visible by an observer situated in the axis A, or more exactly to avoid this observer seeing a light spot, corresponding to the light source, surrounded by two black points, corresponding to the upper and lower faces of the input edge 26, it is advantageous to see to it that each point on the portion of the input edge 26 corresponding to the direct rays re-emits light towards a given area of the output edge.

For example a complex shape 29 can be given to the input edge 26, so that the light rays are collimated in the plane tangential to the plate, in order that these light rays reach a reduced area of the output edge 18. The addition of flutes on this complex shape 29 then makes it possible to optimize the concentration of the rays reaching the area of the output edge 18, and consequently also the size of this area of the output edge 18, in order that this area does not appear brighter than the rest of the boundary for an observer situated in the axis.

The portion of input edge 26 which is oriented towards the front is thus shaped so as to distribute the direct light rays substantially uniformly along the output edge 18. As depicted in FIG. 2, the front portion 29 of the input edge 26 is serrated so as to disperse the light rays into a fan that covers at least the whole of the output edge 18.

Figure 10:
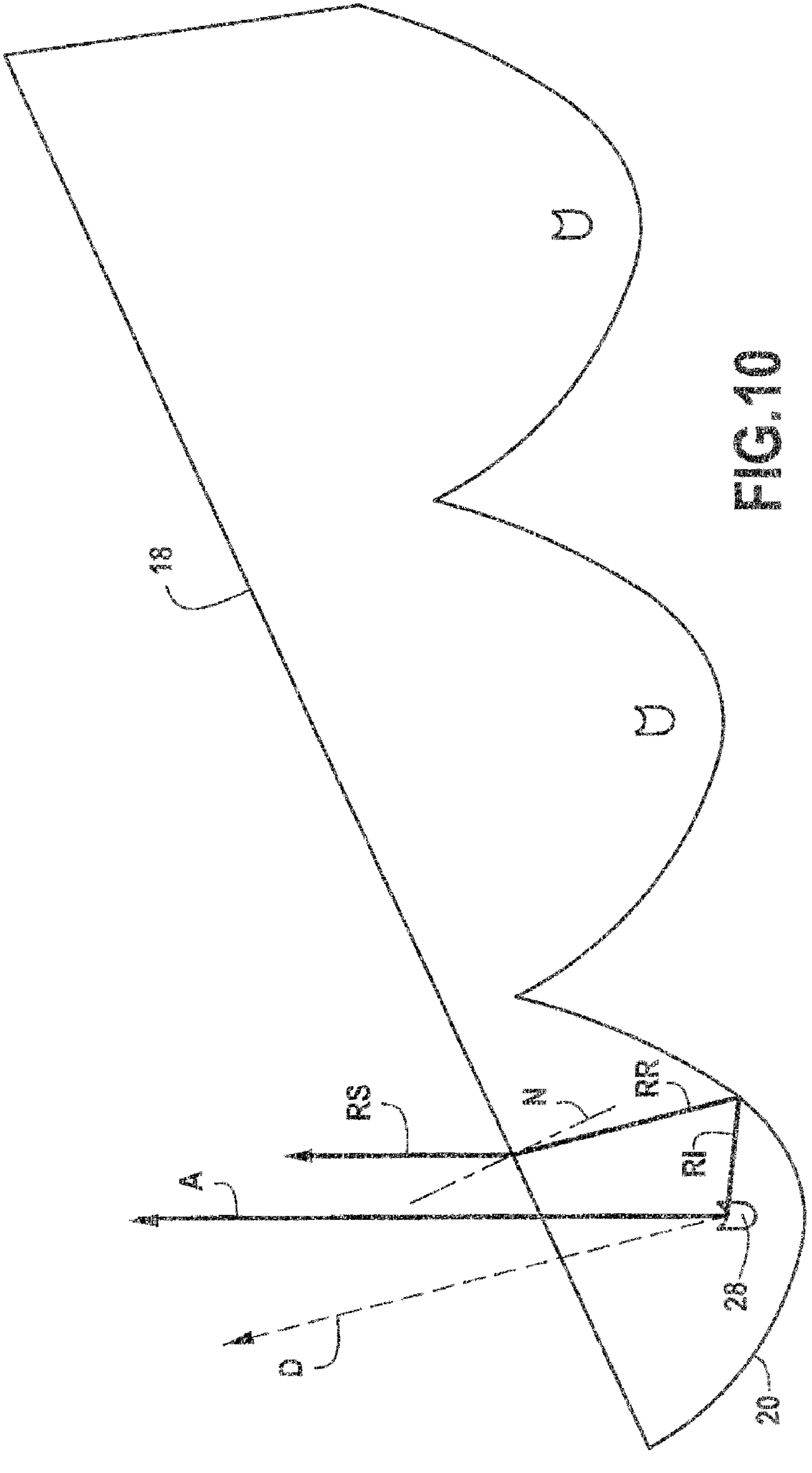
FIG. 10 is a top view of a lighting device according to the invention comprising a flat light guiding plate.

So that the direct light rays are collimated in the plane tangential to the plate, it is also possible to place on the area of the input edge corresponding to the direct rays, in front of the LED with respect to the optical axis, an area with the shape of a convex curved surface, facing the LED 28, the surface being curved in the direction of the LED. For example, the curved area can be put in place of the serrated area 29 depicted in FIG. 2. According to a variant embodiment, depicted in FIG. 10, the aperture inside which the LED 28 is placed has a shape such that it has on the one hand a concave shape, behind the LED 28 with respect to the optical axis "A" of the lighting device and whereof the cross-section is preferentially a semi-circle, and on the other hand a convex curved shape in front of the LED. The concave shape and the convex shape are separated by a flat portion, making it possible to position the light source closer to the concave shape behind than to the convex shape in front. The convex shape is thus moved further away from the source and the cross-section of the cone of direct rays reaching the convex shape is thus reduced. Some of the rays will thus reach the flat part and will be refracted in the direction of the reflection face. The amount of reflected rays is thus increased. It should be noted that, for the sake of clarity, only the aperture is depicted in FIG. 10; the LED 28 is not depicted but its reference indicates its position within the aperture.

Similarly, provision can be made that the input edge 26 is in the shape of a slightly truncated cone, so as to optimize the mean direction of the rays in the plate in the meridian plane with respect to the tangent to the plate.

Figure 4:
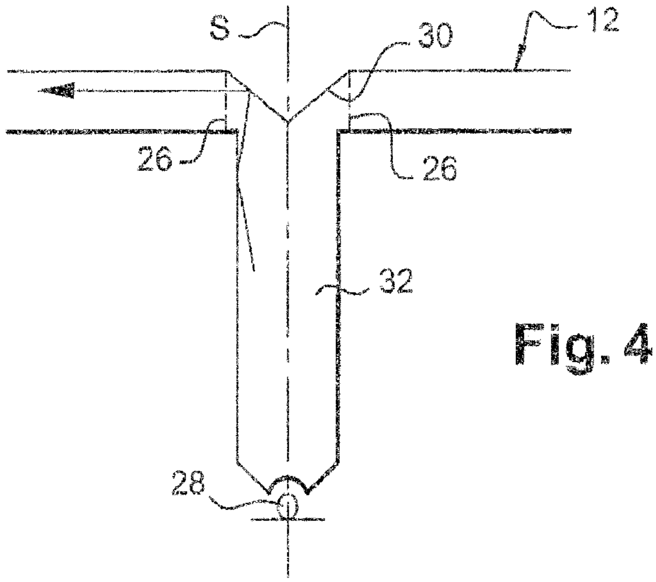
FIG. 4 is a side view depicting a variant of the light source of FIG. 2.

According to a variant depicted in FIG. 4, the light source 28 is arranged in proximity to the input edge 26. The light source 28 is associated with a reflection face 30 which is arranged opposite the light ray input edge. The reflection face 30 is shaped so as to reflect the light rays essentially radially towards the input edge 26 of the light guiding plate 12. The light rays coming from the light source 28 are for example conducted to the reflection face 30 by a light guide 32, an optical fiber (not depicted), or a reflector (not depicted) which focuses the light rays towards the reflection face 30.

The light source 28 is for example a halogen bulb or a light emitting diode.

In the example depicted in FIG. 4, the light rays are guided so as to reach the reflection face 30 essentially along the source axis "S". The reflection face 30 is shaped as a cone of revolution or a portion of cone of revolution with source axis "S" so as to reflect the rays radially in a ring around the source axis "S".

Advantageously, the reflection face 30 is shaped as a rear portion of cone so as to produce no "direct" light rays but only "incident" light rays.

Advantageously, the reflection face 30 forms an upper end face of the light guide 32 and the light guide 32 is made in one piece of material with the light guiding plate 12.

According to the teachings of the invention, the light guiding plate 12 is designed so that the incident light rays emitted towards the rear by the light source 28 propagate in the light guiding plate 12 along so-called "incident" meridian propagation planes "Mi" that radiate radially from the source axis "S". Thus, each light ray is guided so as to follow a radial direction inside the light guiding plate 12 as far as the reflection edge 20. In FIG. 10, the plane "Mi" in which the represented ray "RI" propagates is normal to the page (of drawing) and is along the represented ray "RI".

Moreover, the light guiding plate 12 is also designed so that the rays reflected by the reflection edge 20 propagate towards the front along so-called "reflected" flat propagation planes that are normal to the light guiding plate 12 between the reflection edge 20 and the output edge 18. The reflection edge 20 is more particularly shaped so that the reflected propagation planes "Mr" are oriented parallel to the optical axis "A".

Thus, the reflected light rays are distributed parallel all along the output edge 18 so that each point of the output edge emits a substantially equal amount of light in the direction of the optical axis A. In this way, the output edge is seen uniformly by an observer looking at the output boundary in the axis A.

Advantageously, but non-limitatively, the reflected propagation planes "Mr" are orthogonal to the output edge 18 so that all the reflected light rays that reach the output edge 18 exit without loss of light intensity.

The reflection edge 20 is here perpendicular to the guidance faces 14, 16 of the light guiding plate 12.

This design is made possible on the one hand by the base sphere portion shape 13 of at least one rear portion 12R of the light guiding plate which is passed through by the incident light rays between the light source 28 and the reflection edge 20, and on the other hand by the particular shape given to the boundary of the reflection edge 20.

The rear portion 12R forms at least one angular sector extending from the source axis "S" and which surrounds the reflection edge 20.

On account of the rounded shape as a portion of base sphere 13 of the rear portion 12R of the light guiding plate 12, the reflected propagation planes "Mr" are secants along the same axis which passes through the center "O" of the base sphere and which is coincident with the optical axis "A". Moreover, the source axis "S" is a secant with the optical axis "A" at the center "O" of the base sphere.

Furthermore, the boundary of the reflection edge 20 is defined mathematically by the following equation:

$$\overrightarrow{dOM}\cdot(\vec{u}_i-\vec{u}_r)=\vec{0}$$

"O" being the center of the base sphere of the rear portion of the light guiding plate 12;

"M" being any point on the reflection edge 20;

$\overrightarrow{dOM}$ being the differential of the vector OM, that is to say the tangent at M to the boundary of the reflection edge 20;

$\vec{u}_i$ being a unit vector orthogonal to the incident meridian plane "Mi" passing through the point "M";

$\vec{u}_r$ being a unit vector orthogonal to the reflected propagation plane "Mr" passing through the point "M".

This equation expresses the fact that the image of an incident propagation plane "Mi" by the reflection edge 20 is a propagation plane "Mr".

This differential equation is capable of being solved either by analytical means or numerically using a computer.

When the radius of the base sphere 13 tends to infinity, the light guiding plate 12 can be considered as flat. The reflection edge 20 then has the shape of a parabola and the reflected propagation planes "Mr" are parallel to one another.

However, when the radius of the base sphere 13 is finite, the shape of the reflection edge cannot be likened to a parabola.

The light guiding plates 12 depicted in the figures are here portions of segments of a sphere.

According to a non-depicted variant of the invention, the light guiding plate 12 has a more complex shape. To comply with the conditions described previously, it is however essential that a rear portion 12R of the light guiding plate 12 forms a portion of the base sphere.

On the other hand, whilst complying with the condition according to which the reflected propagation planes "Mr" are secants along the optical axis "A" and orthogonal to the light guiding plate 12, the other front portion 12F of the light guiding plate 12 which is passed through solely by the reflected rays can have various shapes. To do this, the guidance faces 14, 16 form surfaces of revolution around the optical axis "A" passing through the center "O" of the base sphere 13.

The radii of curvature of the cross-section of the light guiding plate 12 along the reflected propagation plane "Mr" are advantageously sufficiently large to avoid the incident light rays reaching one of the guidance faces 14, 16 with an angle greater than the critical angle of refraction and exiting the light guiding plate 12 before reaching the output edge 18.

For example, the light guiding plate 12 can have a front portion of flared shape.

According to another aspect of the invention, depending on the characteristics of the light beam "F" it is sought to obtain, the light guiding plate 12 is supplemented by known optical systems for focusing or on the contrary spreading the light rays forming the light beam "F" in a meridian plane and/or in a plane tangential to the light guiding plate 12.

To that end, the output edge 18 of the light guiding plate is here shaped as a linear lens.

Figure 5:
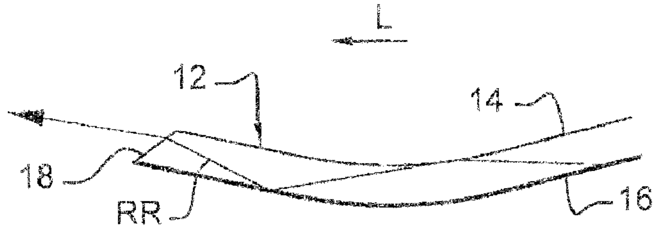
FIG. 5 is a sectional view along the section plane 5-5 of FIG. 3.

The output edge 18 is for example inclined with respect to a direction normal to the plate 12 as depicted in FIG. 5. Thus, the outgoing light rays are deviated by refraction so as to diverge or on the contrary be focused parallel to the optical axis "A".

Figure 6:
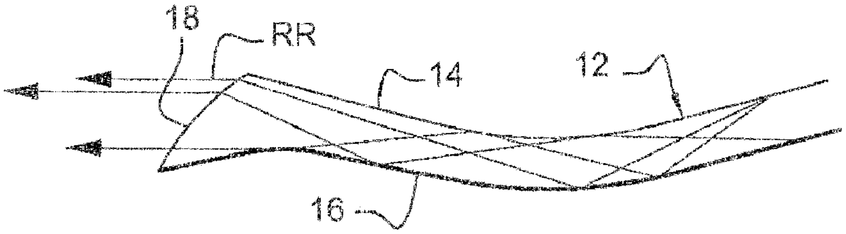
FIG. 6 is a view similar to that of FIG. 5 depicting a variant embodiment of the invention.

According to a variant depicted in FIG. 6, the plate 12 widens out in proximity to the output edge 18, which is itself rounded here, so as to focus the light rays in the reflected propagation plane "Mr".

As depicted in FIG. 7, the output edge 18 can also be provided with radial flutes 34 so as to spread the light in a plane tangential to the light guiding plate 12 in order that the light beam "F" is visible by an observer who is situated at an angle with respect to the optical axis "A".

Figure 8:
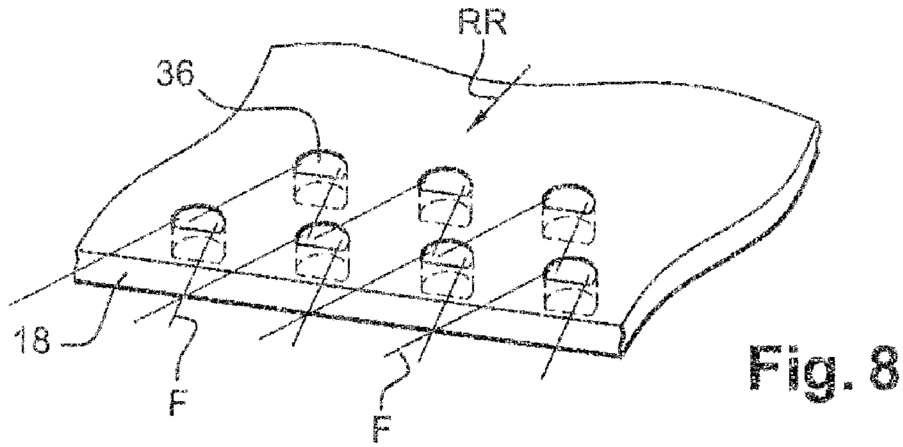
FIG. 8 is a detail perspective view depicting a variant embodiment of the light guiding plates of FIG. 7.

According to a variant of the invention which is depicted in FIG. 8, the flutes 34 are replaced by holes 36 which are made in the light guiding plate 12 in proximity to the output edge 18. The holes 36 are here aligned in staggered rows parallel to the output edge 18. The boundary of the holes is produced so that the reflected rays are deviated by refraction in a divergent manner on arriving at the hole 36 before again entering the light guiding plate 12 in the direction of the output edge 18. The arrangement of the holes 36 in staggered rows makes it possible to not allow any way out via which reflected rays would reach the output edge 18 without passing through a hole 36.

According to another aspect of the invention, as depicted in FIG. 7, a plurality of light guiding plates 12 forming portions of a common base sphere 13 can be arranged so as to obtain a set of light beams forming a single beam, either a closed annular one or in an open arc of a circle.

The boundary of the output edge 18 is then defined as the intersection between the base sphere and a plane perpendicular to the optical axis "A".

Figure 9:
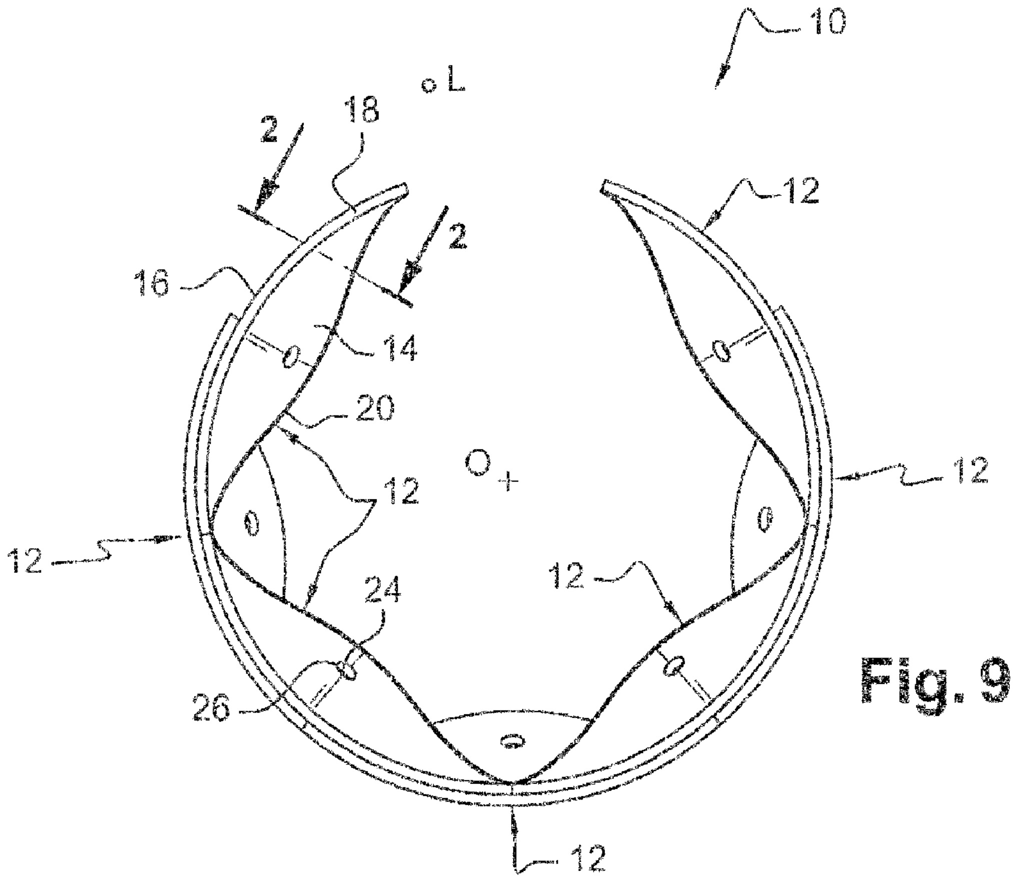
FIG. 9 is a front view depicting an arrangement of several light guiding plates in strata.

According to a variant of the invention depicted in FIG. 9, the light guiding plates are arranged in a first spherical inner stratum of four light guiding plates 12 which are portions of a first common base sphere and in a second spherical outer stratum of three light guiding plates 12 which are portions of a second common base sphere. All the light guiding plates 12 are centered on a common center "O". Thus, two concentric annular beams can be obtained with a lighting or signaling device 10 of reduced size. The light guiding plates 12 of the two strata are arranged in staggered rows so that the light sources 28 are offset annularly with respect to one another around the optical axis "A".

According to a non-depicted variant of the invention, it is also possible to obtain a light beam "F" of non-circular shape by means of light guiding plates whereof the output edge 18 is not in the shape of a flat arc of a circle. Thus, the boundary of the output edges 18 is obtained by the intersection between a base sphere and any surface whatsoever.

It is for example possible to arrange several light guiding plates which have different axes and different radii or curvature, for example for producing any boundary whatsoever consisting of several arcs of circles.

For example, in order to obtain a light beam "F" forming an elliptical ring, the boundary of the output edges 18 is obtained by the intersection between the base sphere 13 and a cylindrical surface of revolution. The output edges 18 then have a skewed boundary, that is to say one that is not flat. The light rays must therefore be redirected, for example by flutes 34, at their exit from the light guiding plate 12 in order to be directed in the essential direction of the optical axis "A".

By virtue of the lighting or signaling device 10 according to the invention, the light rays coming from the light source 28 reach the output edge 18 without losing their intensity. This design therefore makes it possible to obtain a light beam "F" of linear shape, here in the shape of an arc of a circle.

Such a lighting or signaling device 10 has good efficiency, that is to say the intensity of the emitted light beam "F" is scarcely less strong than the intensity of the light source 28. For example, the light beam "F" can have an intensity of 600 Cd for a light source with a luminous flux of 25 Lm.

In general terms, it should be understood that the rear portion 12R of the light guiding plate 12 is advantageously a portion of base sphere in order to optimize the intensity of the light beam as much as possible.

However, the invention is also applicable to light guiding plates that have a shape of a portion of base ellipsoid that differs little from a base sphere so that the light rays deviate slightly from the propagation planes "Mr" and/or "Mi" without the intensity of the light beam being substantially degraded. This is the case in particular for ellipsoids whereof the diameters have relatively close dimensions.

The invention also concerns flat plates, such as for example that depicted in FIG. 10, where the shaping of the reflection edge 20 is determined according to the shape and/or orientation of the output edge 18, so that any incident ray "RI" emitted by the light source 28 is reflected by the reflection edge 20 as a reflected ray "RR" contained in a reflected reflection plane normal to the light guiding plate and making a given angle with the output face 18, such that this ray is refracted by the output face 18 as a light ray "RS" exiting the plate parallel to the optical axis "A".

According to FIG. 10, the output edge 18 is substantially straight and non-perpendicular to the optical axis "A", therefore forming a given angle with the normal to this optical axis. For outgoing rays "RS" parallel to the optical axis, the angle between these outgoing rays and the normal "N" to the output edge 18 is equal to that between the optical axis "A" and that same normal "N". The refractive index of the plate is known and also that of the medium in which the outgoing ray "RS" is travelling. A direct relationship, such as a Descartes equation, therefore makes it possible to obtain the angle of the reflected rays "RR" with the normal "N" to the output edge 18, hereinafter referred to as the "angle of parallel refraction". The reflection edge 20 is formed from three parabolas, with a light source 28 disposed at each of their foci. The reflected rays "RR" are therefore contained in reflected propagation planes parallel to the directrices "D" of the parabolas. Thus, by choosing an orientation of the reflection edge 20 so that the directrices "D" of the parabolas make an angle with the normal to the output edge 18 which corresponds to the angle of parallel refraction, the incident rays "RI" will be reflected by the reflection edge 20 as reflected rays "RR", which will themselves be refracted by the output edge 18 as outgoing rays "RS" parallel to the optical axis "A".

Three parabolas have been depicted but this is not limiting. In fact fewer or more can be provided. By using more parabolas and limiting them on the side, the distance from the focus of the parabola to the output edge is reduced, thus allowing the use of shallower light guiding plates.

According to a non-depicted variant embodiment, the output edge can have a non-straight shape, for example rounded. Under these conditions the shape of the reflection edge will have a complex shape, that is to say a shape distinct from a parabola, ellipse or other simple geometric shapes. For each portion of the output edge, positioning and orientation of the reflection edge are determined, such that the angle of the reflected ray "RR" is refracted as an outgoing ray "RS" parallel to the optical axis "A".

It is possible to place flutes on the output edge, irrespective of the boundary of the output curve. These are flutes or holes 36 as defined previously, in order to make the distribution of the light intensity uniform over the output edge. Moreover, the rays exiting each flute will be distributed laterally but centered around the optical axis A.

According to another variant embodiment, the output edge is perpendicular to the optical axis, the reflection edge forming at least one parabola in the plane of the light guiding plate and whereof the directrix is parallel to this optical axis. The reflected rays are then contained in reflected propagation planes parallel to the optical axis. The output edge is preferentially provided with flutes or holes 36 as defined previously, in order to make the distribution of the light intensity uniform over the output edge. The rays exiting each flute will be distributed laterally but centered around the optical axis A.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lighting or signaling device for a motor vehicle which is capable of emitting a linear beam essentially in a direction of an optical axis, and which comprises:

a light source;

a light ray guiding plate that comprises an edge for inputting light rays, a front edge for outputting said light rays tangentially to said light ray guiding plate, and a rear edge for reflecting said light rays coming from said light source in a direction of an output edge;

wherein said light ray guiding plate comprises an area for coupling with said light source shaped so that said light rays emitted by said light source are propagated radially at said area for coupling around a source axis, wherein said light ray guiding plate is shaped so that said light rays propagate in meridian incident propagation planes normal to said light ray guiding plate between said light source and said rear edge for reflecting, in reflected propagation planes normal to said light ray guiding plate between said rear edge for reflecting and said output edge, and wherein said rear edge for reflecting is shaped so that said reflected propagation planes have an orientation with respect to the optical axis such that said lighting or signaling device is capable of emitting a linear light beam along an essentially longitudinal optical axis.

2. The lighting or signaling device according to claim 1, wherein said reflected propagation planes are parallel to said optical axis of said lighting or signaling device.

3. The lighting or signaling device according to claim 1, wherein said reflected propagation planes are orthogonal to said output edge.

4. The lighting or signaling device according to claim 1, wherein said light ray guiding plate has a curved shape.

5. The lighting or signaling device according to claim 4, wherein at least a first rear portion of said light ray guiding plate which is delimited by an angular sector extending from a source axis and which surrounds a reflection, has a shape of a portion of base sphere.

6. The lighting or signaling device according to claim 5, wherein said source axis passes through a center of said base sphere.

7. The lighting or signaling device according to claim 6, wherein a second front portion of said light ray guiding plate forms a solid of revolution around said optical axis that passes through said center of said base sphere.

8. The lighting or signaling device according to claim 6, wherein said reflected propagation planes are secants along said optical axis.

9. The lighting or signaling device according to claim 1, wherein at least two light ray guiding plates are arranged in a first stratum, at least a third light ray guiding plate being arranged in a second stratum, each light ray guiding plate being a portion of a base sphere.

10. The lighting or signaling device according to claim 9, wherein said light ray guiding plates of said first stratum are portions of a first common base sphere, and in that said light ray guiding plates of said second stratum are portions of a second common base sphere, all said light ray guiding plates being centered on a common center.

11. The lighting or signaling device according to claim 9, wherein said light ray guiding plates have different axes and different radii of curvature.

12. The lighting or signaling device according to claim 1, wherein said output edge comprises means for defining a spread of a light beam around a direction of said optical axis in said reflected propagation plane.

13. The lighting or signaling device according to claim 1, wherein said light ray guiding plate is flat.

14. The lighting or signaling device according to claim 13, wherein said output edge is essentially flat, said rear edge for reflecting having at least one parabolic shape whereof a directrix forms an angle with the normal to the output edge such that the light rays are parallel or essentially parallel to the optical axis once refracted by said output edge.

15. The lighting or signaling device according to claim 13, wherein said output edge is curved, said rear edge for reflecting having a complex shape such that, for any point on said output edge, any ray reflected by said rear edge for reflecting arriving at this point on said output edge is refracted parallel to said optical axis.

16. The lighting or signaling device according to claim 1, wherein said output edge comprises means for defining a spread of a light beam in a plane tangential to said light ray guiding plate.

17. The lighting or signaling device according to claim 16, wherein said output edge comprises flutes that are capable of deviating outgoing light rays by refraction in a plane tangential to said light ray guiding plate.

18. The lighting or signaling device according to claim 16, wherein said light ray guiding plate comprises holes that are arranged in proximity to said output edge, said light rays being deviated from their path in a tangential plane by passing through a wall of a hole before entering said light ray guiding plate again in direction of said output edge.

19. The lighting or signaling device according to claim 1, wherein said edge for inputting light rays comprises a front portion that is shaped so as to disperse said light rays coming from said light source heading directly towards said output edge.

20. A lighting or signaling device for a motor vehicle, said lighting or signaling device capable of emitting a light beam in a general direction of an optical axis, and which comprises:

a light source;

a light ray guiding plate comprising a coupling area adapted so that light rays emitted by said light source are propagated generally radially at a coupling area in operative relationship with a light source axis, wherein said light ray guiding plate is adapted so that said light rays generally propagate in reflected propagation planes comprising an orientation with respect to said optical axis such that said lighting or signaling device is capable of emitting a generally linear light beam along a generally longitudinal optical axis;

wherein said light ray guiding plate that comprises an edge for inputting said light rays, a front edge for outputting said light rays generally tangentially to said light ray guiding plate, and a rear edge for reflecting said light rays coming from said light source in a general direction of an output edge.

21. The lighting and signaling device according to claim 20, wherein said light ray guiding plate has a curved shape.

22. The lighting and signaling device according to claim 21, wherein said reflected propagation planes are generally parallel to said optical axis of said lighting and signaling device.

23. The lighting and signaling device according to claim 21, wherein said reflected propagation planes are generally orthogonal to said output edge.

24. The lighting and signaling device according to claim 20, wherein said edge for outputting said light rays comprises means for defining a spread of said light beam around a direction of said optical axis in said reflected propagation plane.

25. The lighting or signaling device according to claim 20, wherein said output edge is essentially flat, said rear edge for reflecting having at least one parabolic shape whereof a directrix forms an angle with a normal to said output edge such that said light rays are parallel or essentially parallel to said optical axis once refracted by said output edge.

26. The lighting or signaling device according to claim 20, wherein said output edge is curved, said rear edge for reflecting having a complex shape such that, for any point on said output edge, any ray reflected by said rear edge for reflecting arriving at this point on said output edge is refracted parallel to said optical axis.

27. The lighting or signaling device according to claim 20, wherein said output edge comprises means for defining a spread of said light beam in a plane tangential to said light ray guiding plate.

28. The lighting or signaling device according to claim 20, wherein said edge for inputting said light rays comprises a front portion that is shaped so as to disperse said light rays coming from said light source heading directly towards said output edge.

29. A lighting or signaling device for a motor vehicle, said lighting or signaling device capable of emitting a light beam in a general direction of an optical axis, and which comprises:

a light source;

a light ray guiding plate comprising a coupling area adapted so that light rays emitted by said light source are propagated generally radially at a coupling area in operative relationship with a light source axis, wherein said light ray guiding plate is adapted so that said light rays generally propagate in reflected propagation planes comprising an orientation with respect to said optical axis such that said lighting or signaling device is capable of emitting a generally linear light beam along a generally longitudinal optical axis;

wherein at least two light ray guiding plates are arranged in a first stratum, at least a third light ray guiding plate being arranged in a second stratum, each light ray guiding plate being a portion of a base sphere.

* * * * *